US012470025B2

(12) United States Patent
Liu et al.

(10) Patent No.: US 12,470,025 B2
(45) Date of Patent: Nov. 11, 2025

(54) ELECTRICAL CONNECTOR WITH IMPROVED SHIELDING PLATE DEFINING GROUNDING PORTIONS

(71) Applicants: FUDING PRECISION INDUSTRY (ZHENGZHOU) CO.,LTD., Zhengzhou (CN); FOXCONN INTERCONNECT TECHNOLOGY LIMITED, Grand Cayman (KY)

(72) Inventors: Meng Liu, Kunshan (CN); Xiao-Li Liu, Kunshan (CN); Yen-Chih Chang, New Taipei (TW)

(73) Assignees: FUDING PRECISION INDUSTRY (ZHENGZHOU) CO., LTD., Zhengzhou (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 417 days.

(21) Appl. No.: 18/152,766

(22) Filed: Jan. 11, 2023

(65) Prior Publication Data

US 2023/0238746 A1 Jul. 27, 2023

(30) Foreign Application Priority Data

Jan. 26, 2022 (CN) ......................... 202210092312.4

(51) Int. Cl.
*H01R 13/6585* (2011.01)
*H01R 13/6597* (2011.01)

(52) U.S. Cl.
CPC ..... *H01R 13/6585* (2013.01); *H01R 13/6597* (2013.01)

(58) Field of Classification Search
CPC ............ H01R 13/6585; H01R 13/6597; H01R 13/6582
USPC ..................................................... 439/607.05
See application file for complete search history.

(56) References Cited

U.S. PATENT DOCUMENTS

| | | | | |
|---|---|---|---|---|
| 9,509,098 | B1 | 11/2016 | Henry et al. | |
| 11,411,355 | B2 * | 8/2022 | Lv | H01R 13/506 |
| 11,575,231 | B2 * | 2/2023 | Lv | H01R 13/502 |
| 11,831,108 | B2 * | 11/2023 | Little | H01R 13/6592 |
| 2005/0277334 | A1 * | 12/2005 | Huang | H01R 12/00 439/607.01 |

(Continued)

FOREIGN PATENT DOCUMENTS

| | | |
|---|---|---|
| CN | 203445352 U | 2/2014 |
| CN | 103972732 A | 8/2014 |

(Continued)

*Primary Examiner* — Hae Moon Hyeon
(74) *Attorney, Agent, or Firm* — Ming Chieh Chang

(57) ABSTRACT

An electrical connector includes: a housing; a row of first terminals retained in the housing and comprising signal terminals and grounding terminals, each first terminal comprising a plate portion and a leg portion extending out of the housing, the plate portion defining an outer face exposed upon the housing and an inner face opposite the outer face, the outer face of the plate portion of the terminal defining a mating face; a first shielding plate parallel to and located by the inner faces of the first terminals; the first shielding plate defines plural first grounding portions, each first grounding portion defines a vertical cutting face which touches a corresponding inner face of the plate portion of an associated grounding terminal.

19 Claims, 15 Drawing Sheets

(56) References Cited

U.S. PATENT DOCUMENTS

| | | | | |
|---|---|---|---|---|
| 2009/0221165 | A1 | 9/2009 | Jonathan et al. | |
| 2011/0269346 | A1 | 11/2011 | Casher et al. | |
| 2015/0004839 | A1 | 1/2015 | Wang et al. | |
| 2020/0328541 | A1 | 10/2020 | Lai et al. | |
| 2021/0218197 | A1* | 7/2021 | Lv | H01R 13/6582 |
| 2021/0218201 | A1* | 7/2021 | Lv | H01R 13/6594 |
| 2022/0029360 | A1* | 1/2022 | Little | H01R 13/405 |
| 2022/0216653 | A1* | 7/2022 | Little | H01R 13/424 |

FOREIGN PATENT DOCUMENTS

| | | | |
|---|---|---|---|
| CN | 108808312 | A | 11/2018 |
| CN | 208157687 | U | 11/2018 |
| CN | 109301545 | A | 2/2019 |
| CN | 110247261 | A | 9/2019 |
| CN | 111129803 | A | 5/2020 |
| CN | 211428493 | U | 9/2020 |
| CN | 113036538 | A | 6/2021 |
| CN | 113193437 | A | 7/2021 |
| CN | 113540926 | A | 10/2021 |
| CN | 114122832 | A | 3/2022 |
| CN | 114649717 | A | 6/2022 |

* cited by examiner

ELECTRICAL CONNECTOR WITH IMPROVED SHIELDING PLATE DEFINING GROUNDING PORTIONS

BACKGROUND OF THE INVENTION

1. Field of the Invention

The present invention relates to an electrical connector with at least one shielding plate defining grounding portions for contacting grounding terminals.

2. Description of Related Arts

Many electrical connectors include signal terminals and ground terminals in which the signal terminals convey data signals and the ground terminals reduce crosstalk and/or electromagnetic interference (EMI) between the signal terminals. In differential signaling applications, the signal terminals are arranged in signal pairs for carrying the data signals.

To address grounding resonance issue with a higher and higher signal-transmitting application, previous patents apply grounding bars to push the resonance frequency to a higher frequency. A metallic grounding bar connects all grounding terminals among signal terminals together, thereby realizing a common grounding bar. U.S. Patent Application Publication No. 2009/0221165 discloses a shieldless grounding coupling assembly, which shift unwanted spikes in insertion loss resonance frequencies to a higher frequency. Therefore, the shift resonance frequencies of existing connectors can extend to a higher operating frequency range without changing the mating or mounting interface dimensions of existing standardized or non-standardized connectors. U.S. Patent Application Publication No. 2011/0269346 discloses a grounding bridge connecting with grounding terminals, which can reduce an electrical length of the grounding terminals and move a resonance frequency of the grounding terminals of the connector outside the range of the frequencies at which signal will transmit.

Therefore, an improved electrical connector is desired.

SUMMARY OF THE INVENTION

An object of the present invention is to provide an electrical connector with an improved shielding plate.

In order to achieve above-mentioned object, an electrical connector comprises: a housing; a row of first terminals retained in the housing and comprising signal terminals and grounding terminals, each first terminal comprising a plate portion and a leg portion extending out of the housing, the plate portion defining an outer face exposed upon the housing and an inner face opposite the outer face, the outer face of the plate portion of the terminal defining a mating face; a first shielding plate parallel to and located by the inner faces of the first terminals, wherein the first shielding plate defines a plurality of first grounding portions, each first grounding portion defines a vertical cutting face which touches a corresponding inner face of the plate portion of an associated grounding terminal.

Other objects, advantages and novel features of the present invention will become more apparent from the following detailed description of the present embodiment when taken in conjunction with the accompanying drawings.

DETAILED DESCRIPTION OF THE PREFERRED EMBODIMENT

Figure 1:
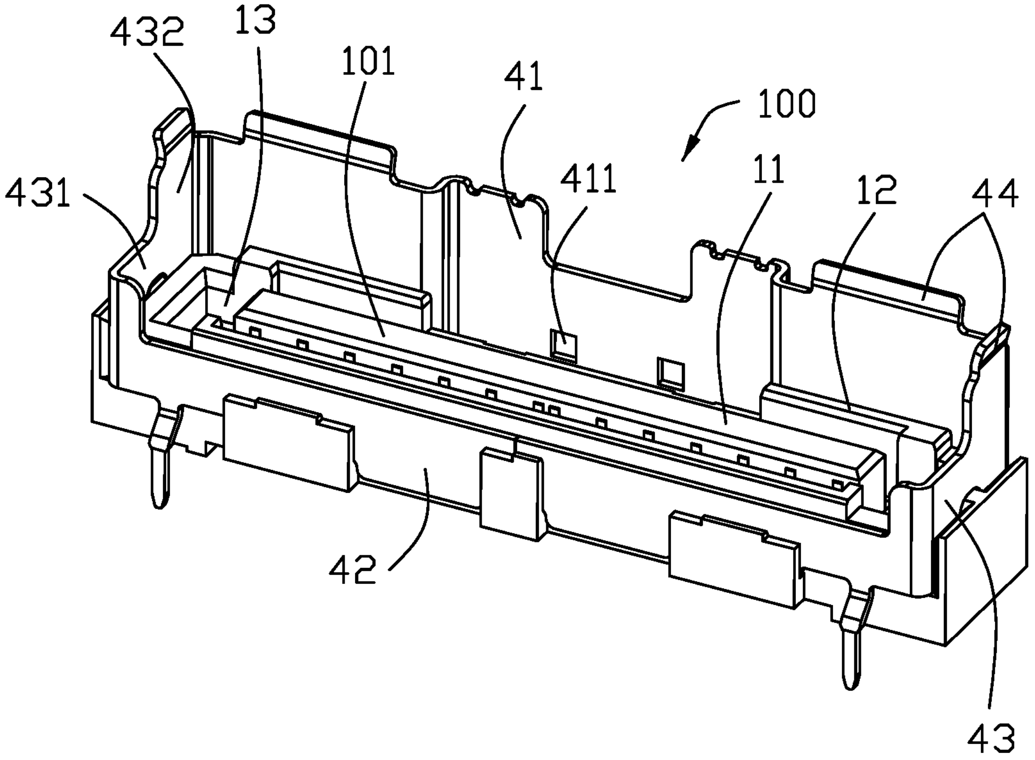
FIG. 1 is a top perspective view of an electrical connector in accordance with the present invention.

Reference will now be made to the drawing figures to describe the preferred embodiment of the present invention in detail.

An electrical connector assembly of an embodiment of this present invention comprises a receptacle connector 100 to be mounted on a printed circuit board (PCB) and a cable plug connector 600 connecting with two rows of cables adapted for mating with the receptacle connector 100.

Figure 2:
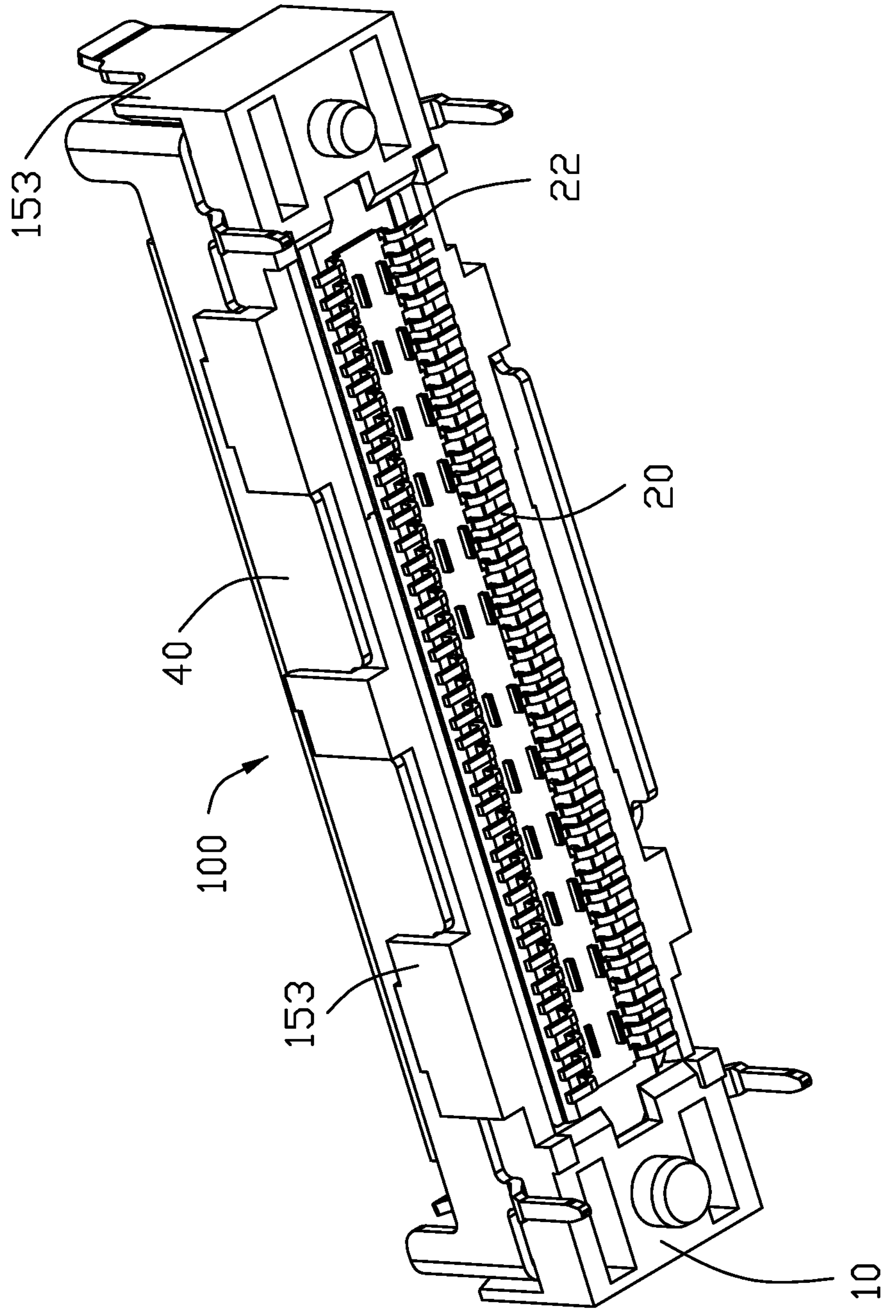
FIG. 2 is a bottom perspective view of the electrical connector of FIG. 1.

FIGS. 1-11 illustrate the receptacle connector 100. As best shown in FIGS. 1-2, the receptacle connector 100 includes a housing 10, terminals 20 made from a metal plate and retained in the housing 10 and a metallic shell 40. The housing 10 includes a mating tongue 11 and a frame portion 12 surrounding the mating tongue 11, commonly defining a mating cavity 13 between the mating tongue 11 and the frame portion 12, the mating cavity 13 runs through a mating face 101 defined on the housing 10. The metallic shell 40 is attached an outside of the wall portion 12 and protrudes upward beyond the mating face 101. A first side plate 41 of the metallic shell 40 defines two locking holes 411, locking heads 652 of a locking arm 651 of the plug connector 600 protrude into the locking holes 411 from an outside of the first side plate 411, thereby obtaining a locking function of the two connectors. A second side plate 42 is substantial flushed with the mating face 101 and have a top edge lower than that of the first side plate 41. Two end plates 43 is of a step shape, each includes a first taller portion 431 and a second taller portion 432 extending beyond the mating face 101, the second taller portion 432 is substantial flushed with the first side plate 41 and higher than the first taller portion 431. Parts of the first taller portions 431 extend to the second side plate 42. A plurality of guiding tabs 44 extends upwards from the first side plate 41 and the second taller portion 432. Combination with FIG. 12, understandingly, the step portion of the metallic shell 40 provides an improved guiding performance during an engagement of the two connectors, and an improved enforced balance of two connectors. The housing 10 defines retaining portions 153 with slits, the shell 40 seats in the slits for fitly retaining the shell on the housing 10.

Figure 3:
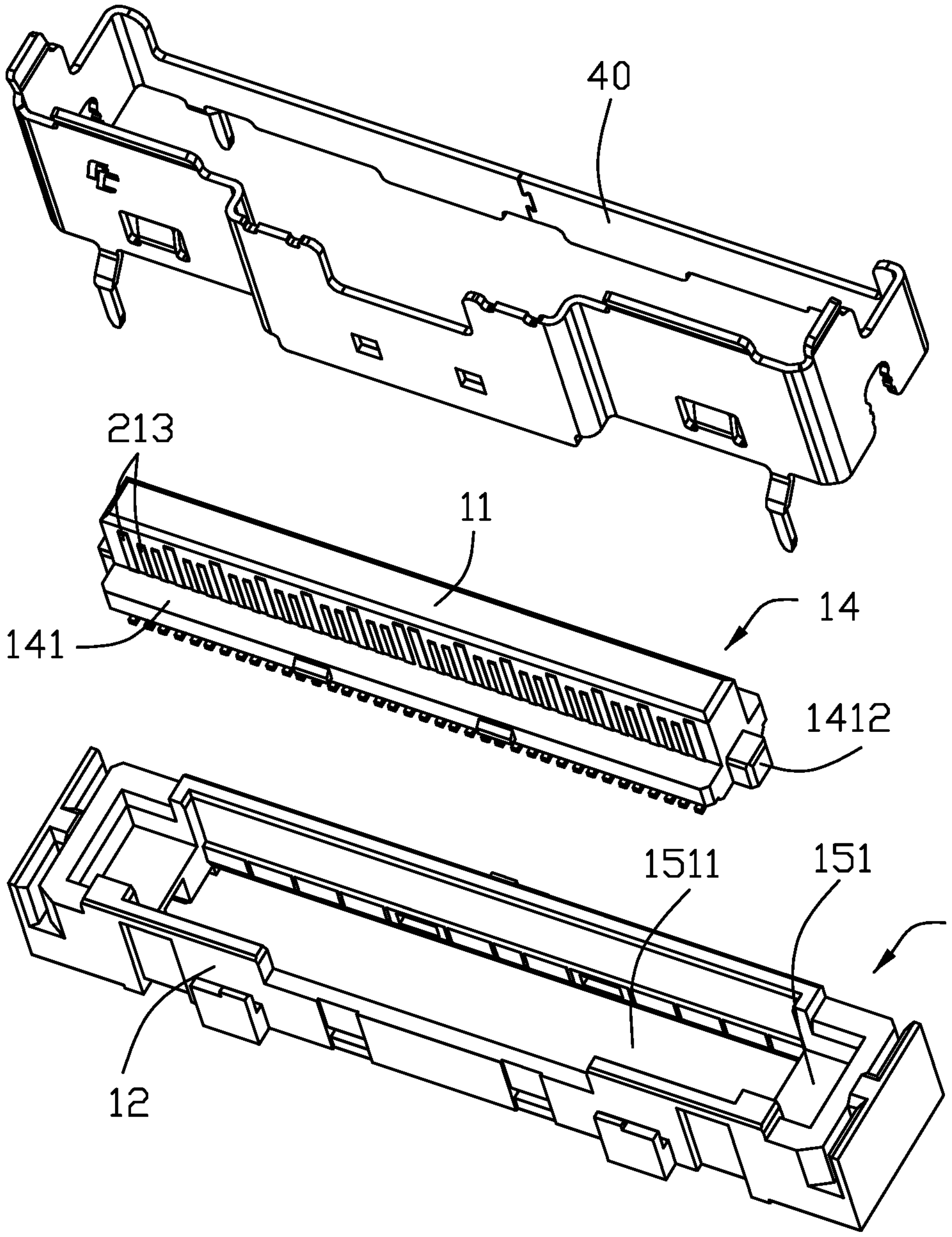
FIG. 3 is an exploded perspective view of the electrical connector of FIG. 1.
Figure 4:
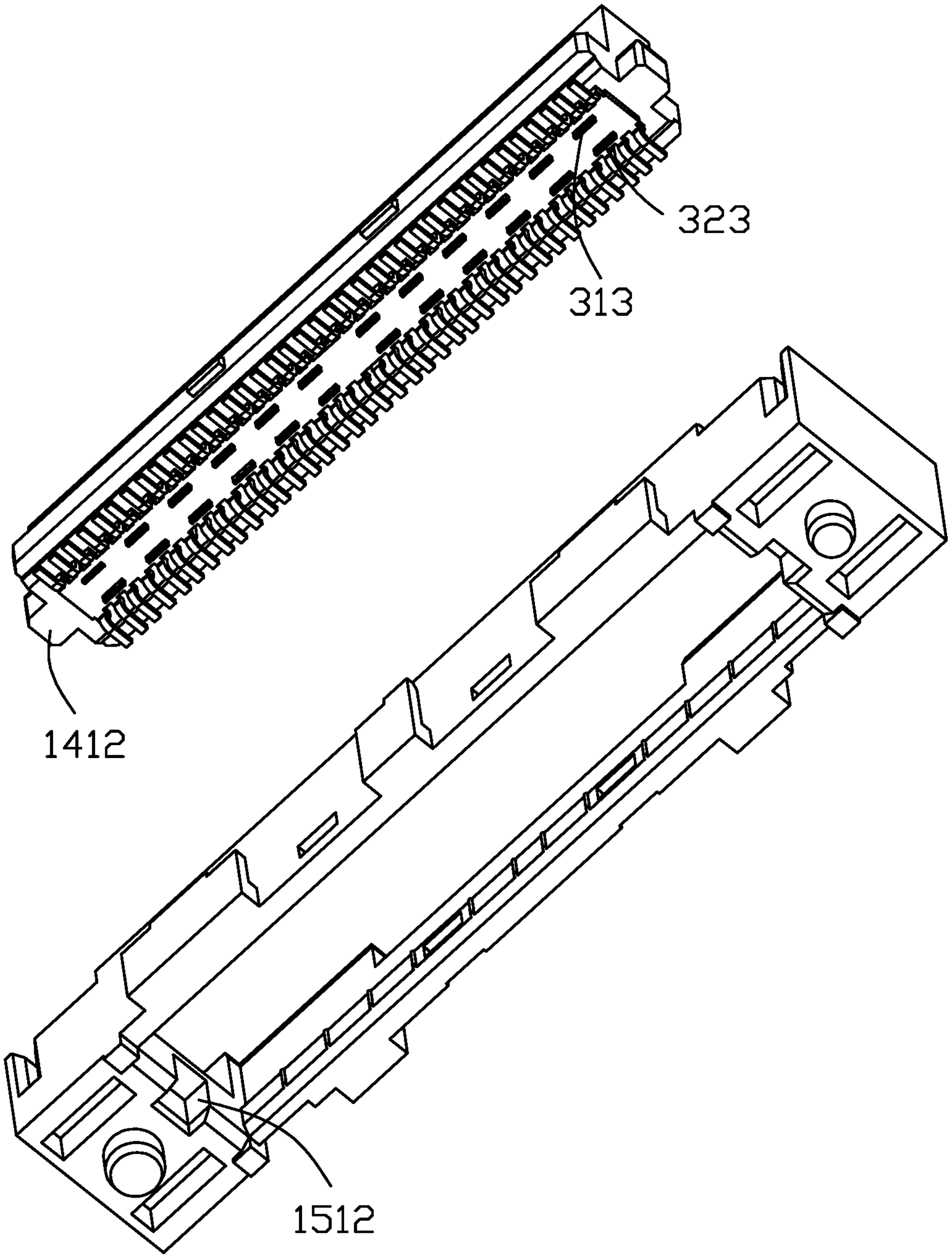
FIG. 4 is another exploded perspective view of the electrical connector of FIG. 3 without the metallic shell.

Referring to FIGS. 3-4 the housing 10 includes a mating block 14 and a housing block 15 assembled together, the mating block 14 includes the mating tongue 11 and a mounting portion 141 below the mating tongue 11, the housing block 15 includes a board portion 151 with a mounting opening 1511 and the frame portion 12. The mating block 14 is assembled through the mounting opening 1511 from a bottom end of the housing block 15, and the mounting portion 141 is fitly retained in the mounting opening 1511, thereby forming the housing 10. The mounting portion 141 defines two retaining lumps 1412 at opposite ends thereof, the board portion 151 defines recesses 1512 at a bottom face thereof. The retaining lumps 1412 are retained in the recesses 1512. Please notes, the recesses 1512 do not go upwards through the board portion 151, for limiting an upward movement of the mating block 14. In this embodiment, the terminals 20 are set in two rows and retained in the mating block 14. The mounting opening 1511 defines plural upright ribs (not labeled) and two slots (not labeled), the mating block 14 is interfered with the upright ribs and defines lumps received in the slots.

Figure 5:
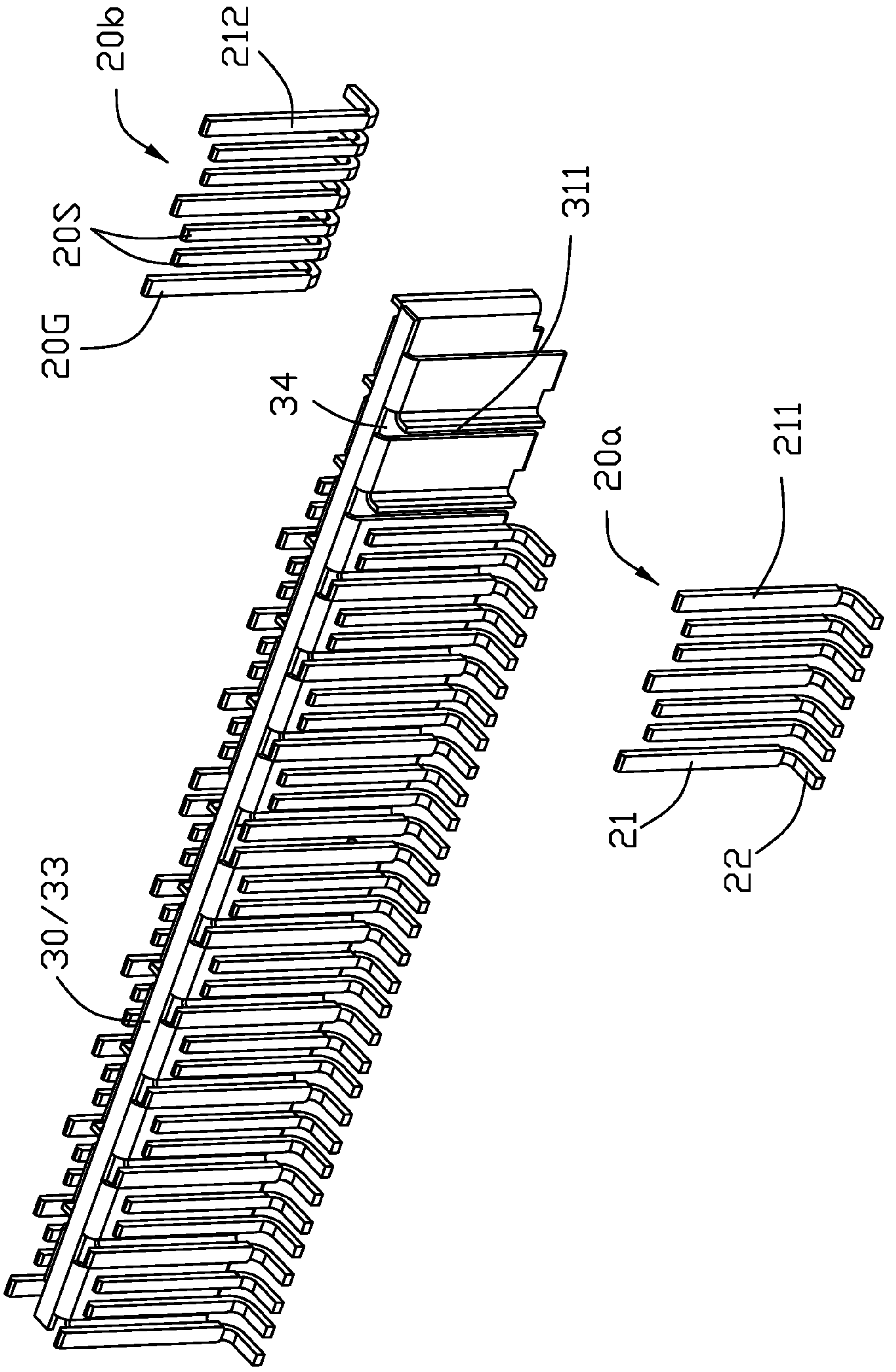
FIG. 5 is a partially exploded perspective view of a shielding member and two rows of terminals of the electrical connector of FIG. 3.
Figure 6:
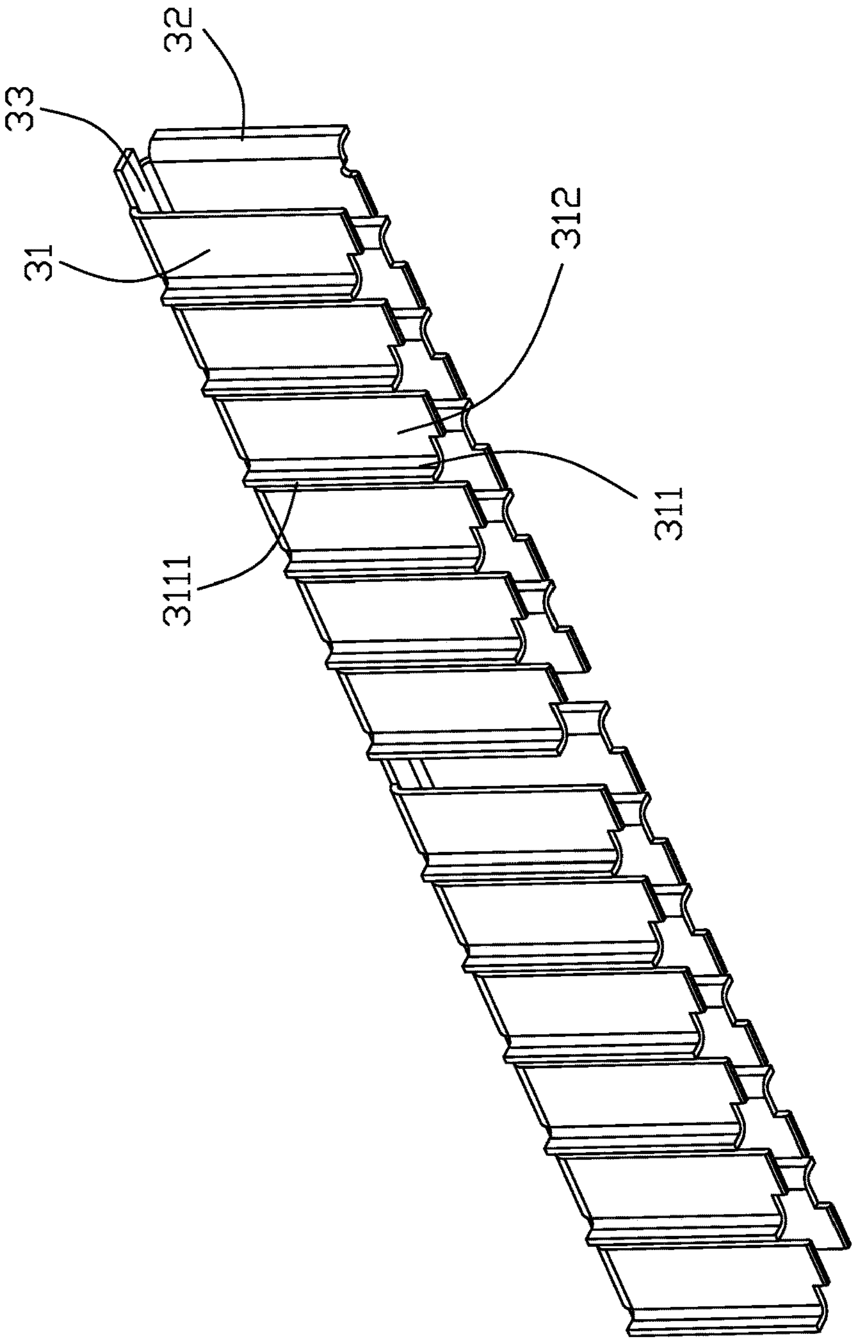
FIG. 6 is a bottom perspective view of the shielding member of FIG. 3.
Figure 7:
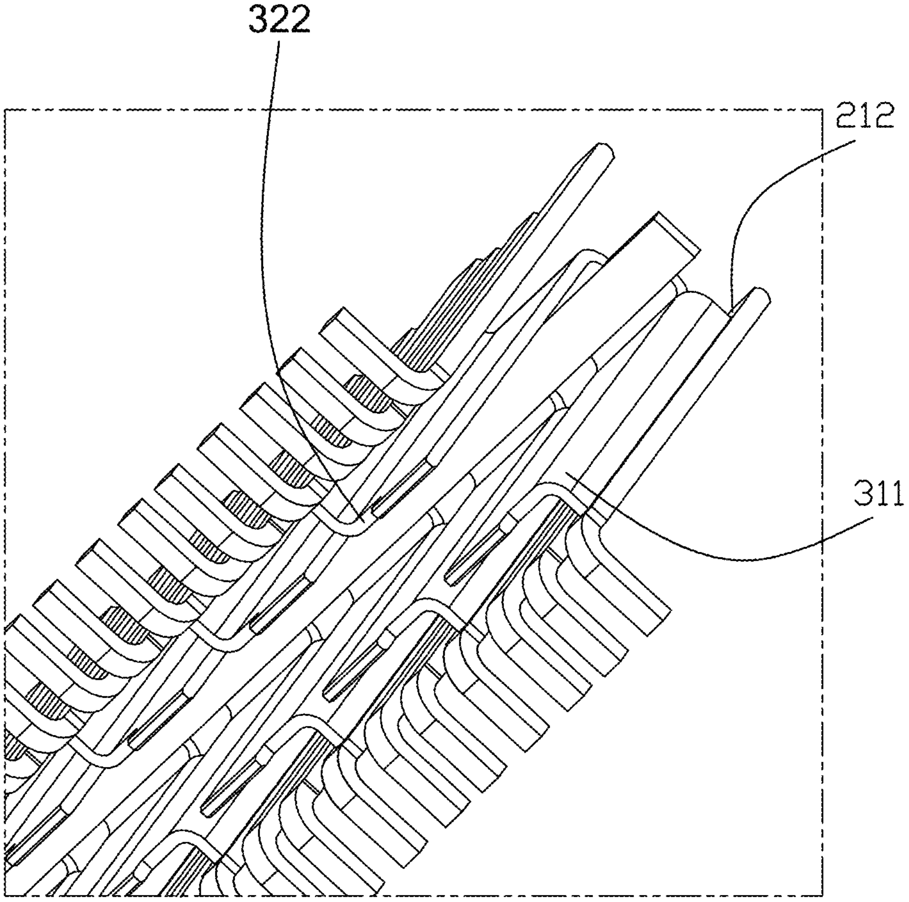
FIG. 7 is a bottom perspective view of the shielding member and the two rows of terminals of FIG. 3 in part.

Referring to FIGS. 5-6, the terminals 20 includes plate portions 21 and leg portions 22 extending from the plate portions 21 out of the housing 10, the plate portion 21 defines an inner face 212 and an outer face 211 exposed upon the housing 10 and functioned as a mating face or portion 213 as shown in FIG. 3. Each row of the terminals 20 at least includes a signal terminal 20S and a grounding terminal 20G, in this embodiment two adjacent signal terminal 20S are construed as a pair of differential signal terminals, the grounding terminals 20G and the pairs of differential signal terminals alternate one by one. Each pair of differential signal terminals is sandwiched between two grounding terminals 20G at opposite sides thereof. The plate portions 21 of the grounding terminal 20G are longer than that of the signal terminals 20S and wider than that of the signal terminals.

In this embedment, a shielding member 30 with two shielding plates is added between the two rows of terminals 20, i.e., a row of first terminals 20*a* and a row of second terminals 20*b*. The shielding member 30 includes a first shield plate 31 and a second shielding plate 32 and a connecting bar 33 unitarily connecting with the first and second shielding plates 31, 32.

The first shield plate 31 is made from a metal plate and then cut in an upright direction and then in a longitudinal direction to form a plurality of portions, the portions bend in a transverse direction perpendicular to the upright direction and the longitudinal direction, thereby forming a plurality of first grounding portions 311. Each first grounding portion 311 defines an upright cutting face 3111 and a horizontal cutting face (not labeled). Similarly, the second shielding plate 32 defines a plurality of second grounding portions 321 with an upright cutting face 3211. The first shielding plate 31 is disposed by the inner faces 212 of the plate portions 21 of the row of the first terminals 20*a*, the upright cutting faces 3111 press against the inner faces 212 of the plate portions of corresponding grounding terminals 20G of the row of the first terminals 20*a*. Similarly, the second shielding plate 32 is located by an inner side of the row of the second terminals 20*b*, the upright cut faces 3211 of the second grounding portions 321 press against the inner faces 212 of the plate portions of corresponding grounding terminals 20G of the row of the second terminals 20*b*. The face contacts between the grounding portions and the grounding terminals increase the quantity of contacting points, resulting in shifting a resonance frequency of the receptacle connector 100 to a high range to meet a requirement of electrical performance. The definition of first and second in this embodiment is only to indicate different elements, with no sequence of the elements.

Figure 8:
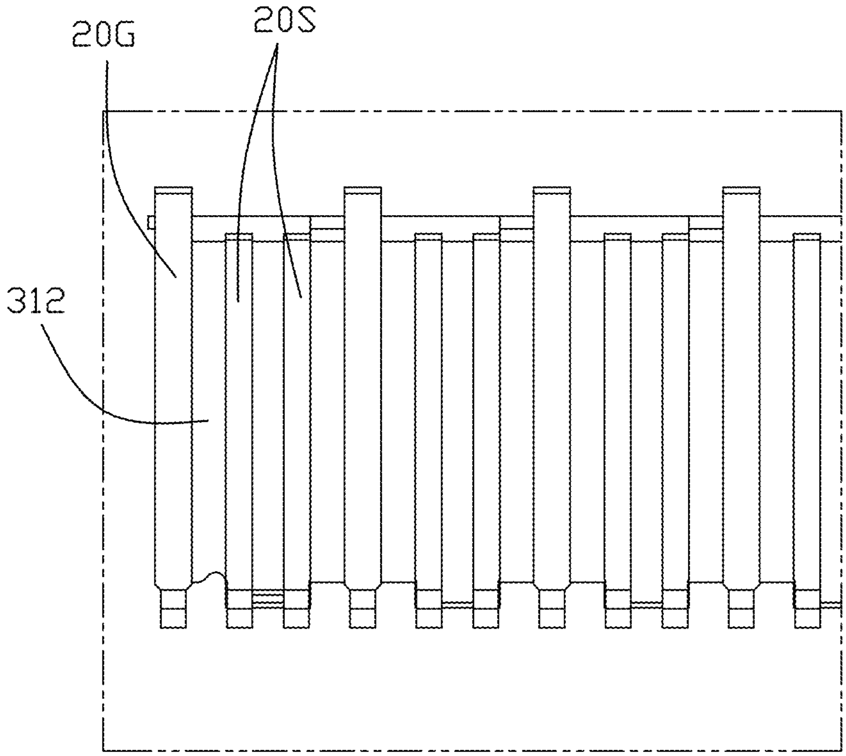
FIG. 8 is a front elevational view of the shielding member and the two rows of terminals of FIG. 3 in part.
Figure 9:
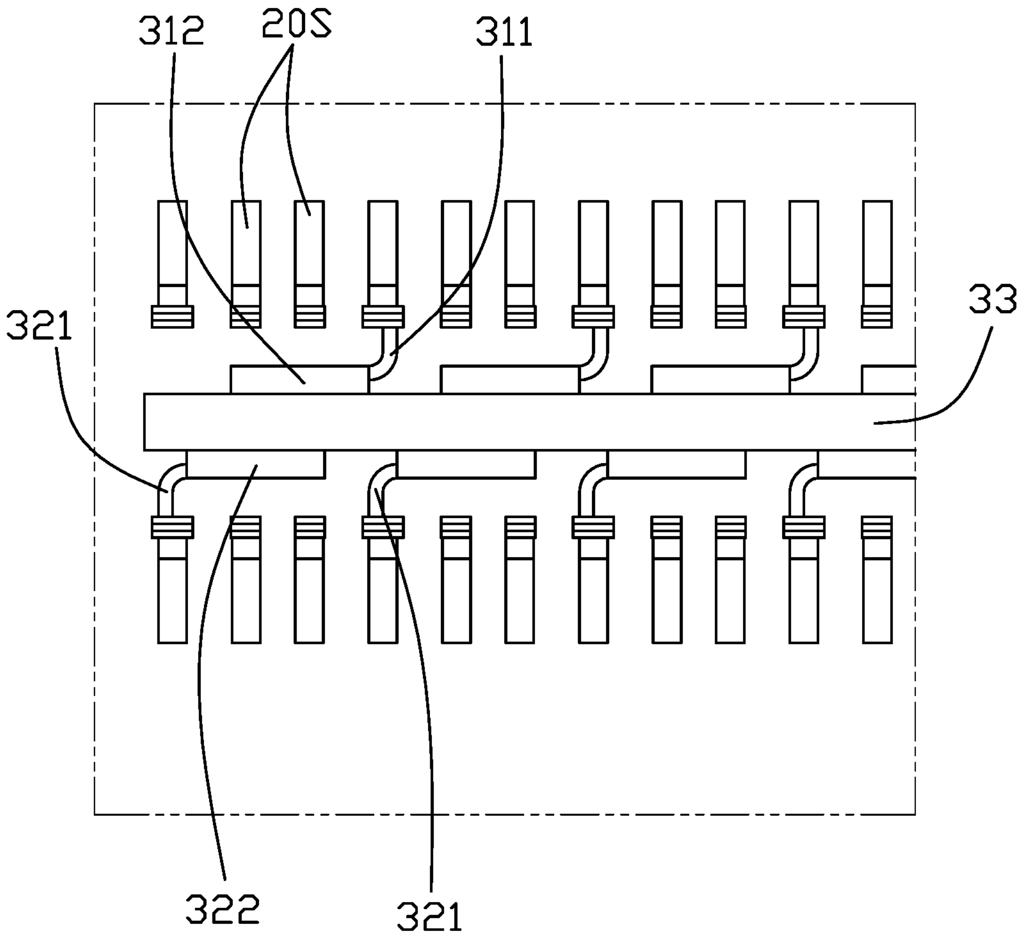
FIG. 9 is a top plan view of the shielding member and the two rows of terminals of FIG. 3 in part.
Figure 10:
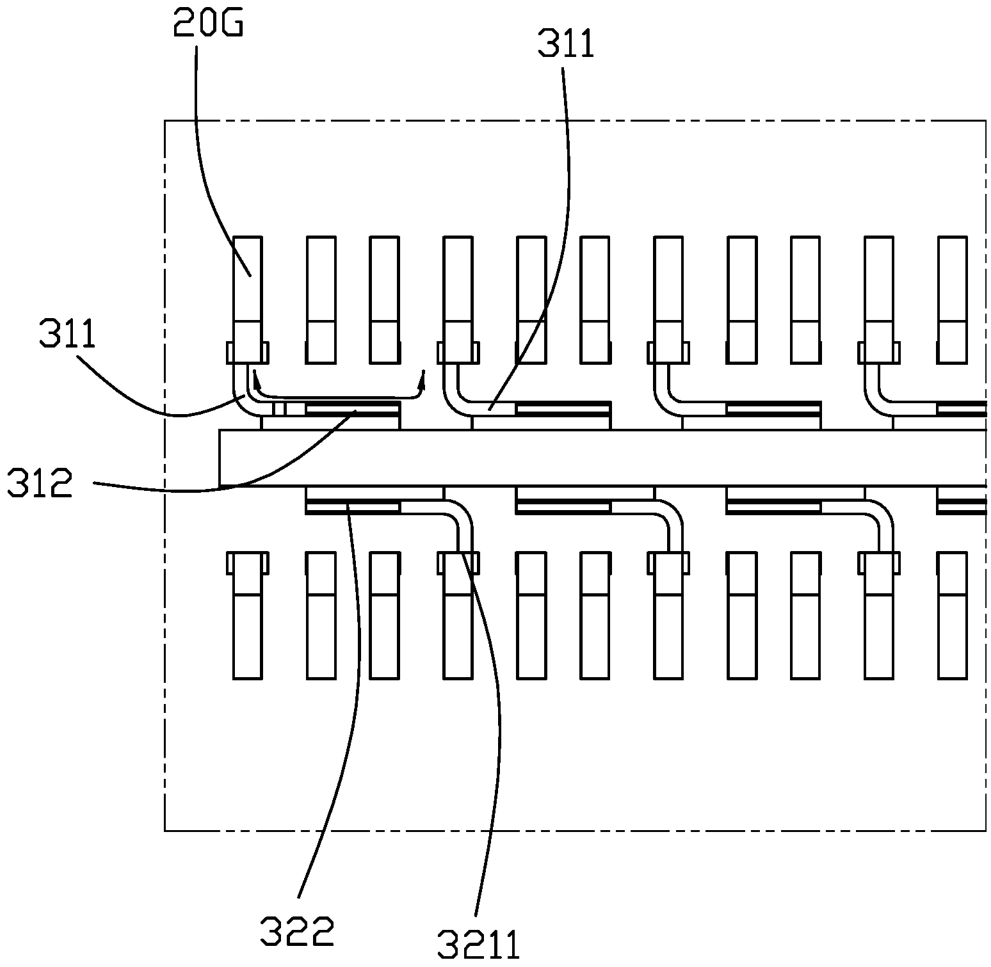
FIG. 10 is a bottom plan view of the shielding member and the two rows of terminals of FIG. 3 in part.

The remainder portions between the adjacent grounding portions are shielding portions 312, 322, as shown in FIG. 9; top edges of the shielding portions are higher than top edges of the signal terminals 20S and top edges of the grounding portions 311, 321 are lower than that of the grounding terminals 20G, as shown in FIG. 8. A width of each shielding portion 312, 322 is wider than that of the two plate portions of corresponding pair of the differential signal terminals. Therefore, the shielding portions 312, 322 shield the pairs of the differential signal terminals in the longitudinal direction and the upright direction. In a view from a bottom end of the housing 10 as shown in FIG. 10, the shielding portions 312, 322 are aligned with each other, the grounding portions 311, 321 are of an L shape, the first grounding portions 311 extend from a first/left side of the first shielding portions 312, the second grounding portions 321 extend from a second/right side of the second shielding portions 322. Another sides of the shielding portions have no grounding portions. Viewed in a direction perpendicular to the shielding portions 312, 322, the first grounding portions 311 are overlapped with the adjacent second grounding portions 321. Therefore, in the longitudinal direction, the first and second shielding portions 312, 322 have entire shielding performance. The grounding portions 311, 321 and the shielding portions 312, 322 are of an L-shape or of a C shape, which are not a closed shape and destroy resonance cavity illustrating in arrows in FIG. 10, so as to improve high transmit electrical performance. The first and the second shielding portions 312, 322 protrude downward beyond the bottom face of the housing, as shown in FIG. 4.

Understanding, each row of terminals is arranged in a first direction/the longitudinal direction, and each terminal extends in a second direction perpendicular to the first direction. The shielding plate define a plurality of L-shaped slits 34 running through a bottom edge thereof, the grounding portions bend along the corresponding L-shaped slits. The shielding portion 321, 322 extends in the first direction and the second direction, the grounding portions 311, 321 bends from the corresponding shielding portions in a third direction/the transverse direction perpendicular to the first direction and the second direction. As seen, the shielding portions are separated from the adjacent shielding portion and only unitarily connected with the connecting bar 33, the grounding portions are separated from the adjacent grounding portions and separated from the connecting bar 33. That is, the shielding portions are separated from each other and the grounding bending from the same sides of the corresponding shielding portions. Therefore, the shielding portion and corresponding grounding portion construe an opening shape, which will not form a resonance cavity.

Figure 11:
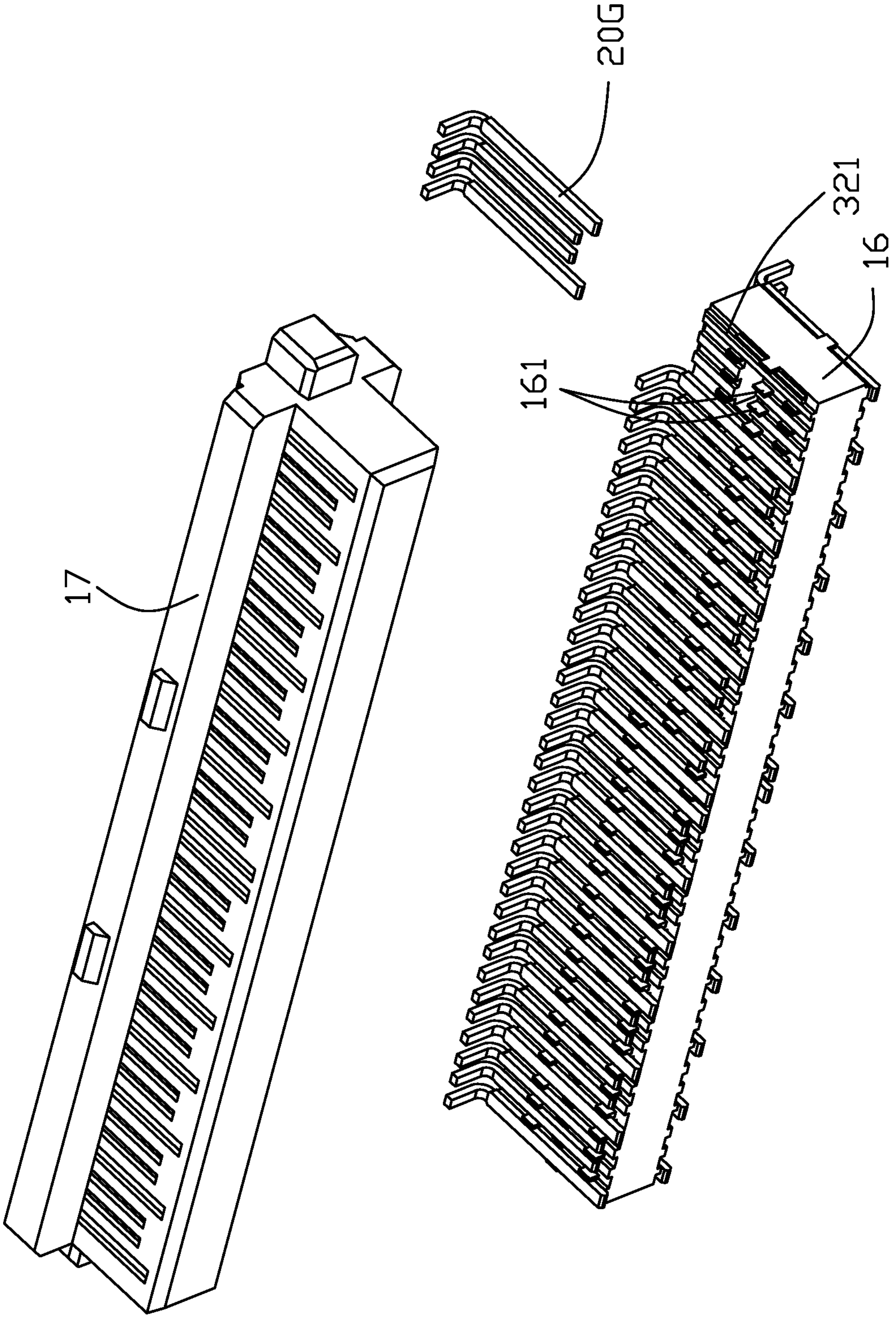
FIG. 11 is an exploded perspective view of a mating block of the electrical connector of FIG. 3.
Figure 12:
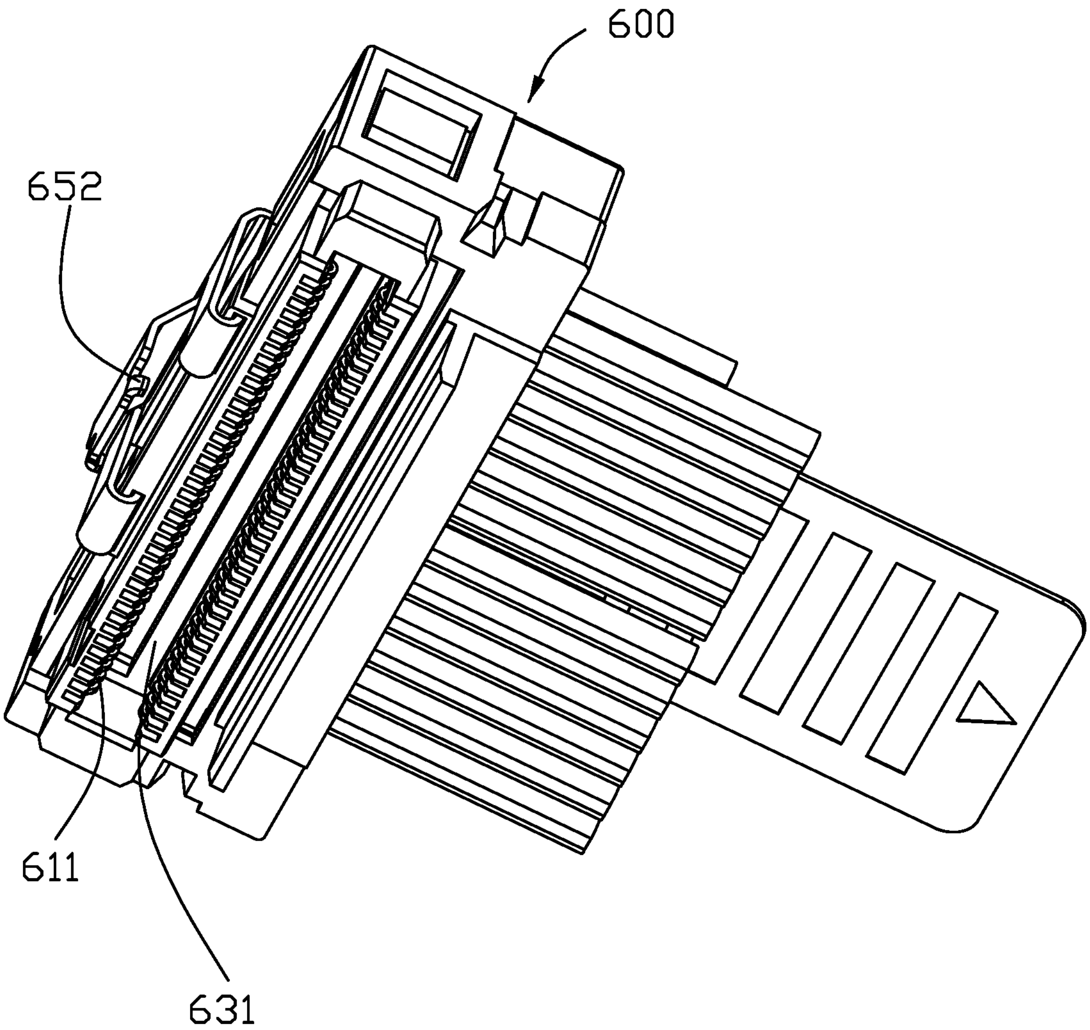
FIG. 12 is a bottom perspective view of a plug connector adapted for mating with the electrical connector of FIG. 1.
Figure 13:
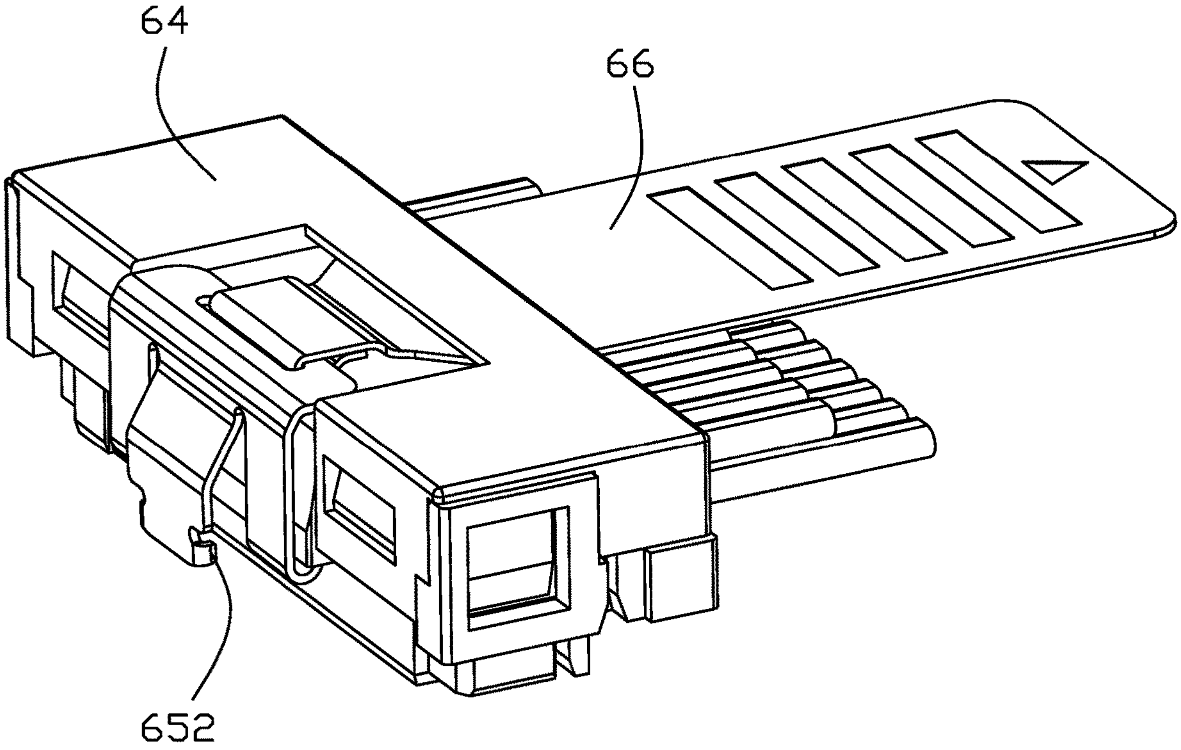
FIG. 13 is a top perspective view of the plug connector of FIG. 12.
Figure 14:
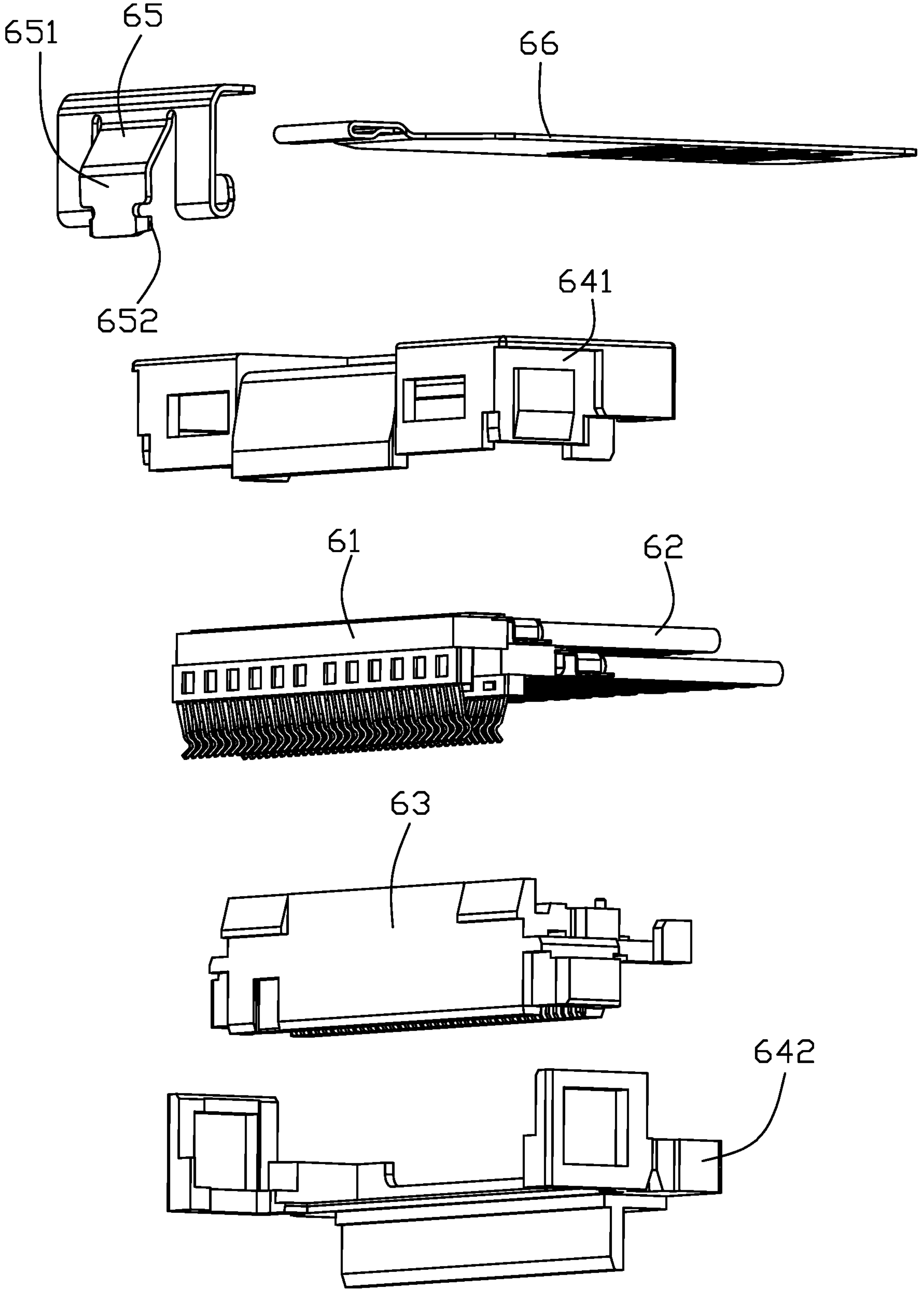
FIG. 14 is an exploded view of the plug connector of FIG. 13.
Figure 15:
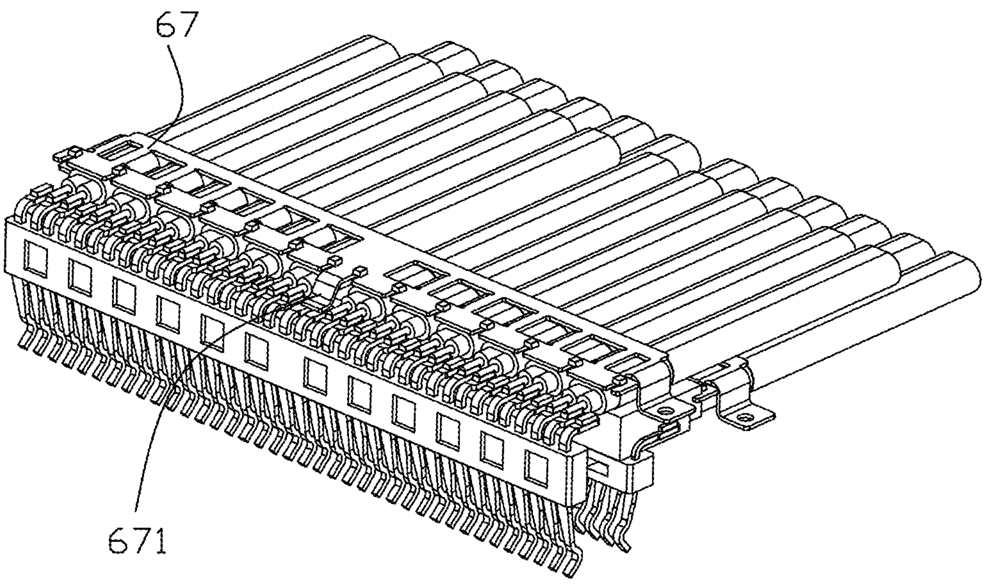
FIG. 15 is a perspective view of terminal modules, cables and a grounding member of FIG. 14.

Referring to FIG. 11, insulating material is inserted molded with the shielding member 30 and forms a first assembly including the first insulator 16 and the shielding member 30 embedded in the first insulator 16. The grounding portions 311, 321 are exposed upon opposite outer faces of the first insulator 16, and the two rows of terminals are positioned in the opposite outer faces of the first insulator 16, please note, the grounding terminals 20G is disposed on the grounding portions 311, 321. Another insulating material is inserted molded with the first assembly and form a second insulator 17 enclosing the first insulator 16 and the two rows of the terminals 20, which construe said mating block 14. Please note, the first insulator 16 defines plural of positioning lumps 161 at the outer face thereof, to position the signal terminals and the grounding terminals in the outer face of the first insulator. The first insulator 16 and the second insulator have similar dielectric constant, floated up and down 10%. The insulating material of the first housing 16 can be wave-absorbing material, like carbonium which has an obvious function to restrain cross-talk. When the carbonium content of the first insulator up to 32%, the electrical performance of the receptacle connector 100 can meet the requirement of fine pitch connectors.

In FIGS. 12-16, the plug connector 600 includes two contact modules 61 and two rows of cables 62 connecting with the contact modules and the contact modules are assembled in the insulating base 63 and define a receiving cavity 631 into which elastic contacts 611 extend. An upper insulating cover 641 and a lower insulating cover 642 cover the insulating base 63 to retain the insulating base and the cables together. The locking member 65 is assembled on the insulating cover 64 and a strip 66 connects with the locking member 65. The cables connect with the elastic contacts of the contact modules 61 and a grounding member 67 is disposed over the cables; a grounding finger 671 extends from a middle portion of the grounding member 67 and is soldered with the grounding terminals of the elastic terminals.

In alternative embodiment, the shielding member can be made by punch, cast. The shielding member can be made from material of high magnetic conductivity, including but not limited to Fe, Co, or Ni element or its alloy.

Although the present invention has been described with reference to particular embodiments, it is not to be construed as being limited thereto. Various alterations and modifications can be made to the embodiments without in any way departing from the scope or spirit of the present invention as defined in the appended claims.

The invention claimed is:

1. An electrical connector comprising:
a housing;
a row of first terminals retained in the housing and comprising signal terminals and grounding terminals, each first terminal comprising a plate portion and a leg portion extending out of the housing, the plate portion defining an outer face exposed upon the housing and an inner face opposite the outer face, the outer face of the plate portion of the terminal defining a mating face;
a first shielding plate parallel to and located by the inner faces of the first terminals;
wherein the first shielding plate defines a plurality of first grounding portions, each first grounding portion defines a vertical cutting face which touches a corresponding inner face of the plate portion of an associated grounding terminal.

2. The electrical connector as claimed in claim 1, wherein the first shielding plate defines a first shielding portion between two adjacent first grounding portions, and top edges of the first shielding portions are higher than top edges of the signal terminals of the first terminals.

3. The electrical connector as claimed in claim 1, wherein the first shielding plate defines a first shielding portion between two adjacent first grounding portions, the first grounding portions bend from first sides of corresponding first shielding portions, and opposite second sides of the first shielding portions have no grounding portions.

4. The electrical connector as claimed in claim 3, wherein each first grounding portion and corresponding first shielding portions are substantially L-shaped.

5. The electrical connector as claimed in claim 1, wherein the housing comprises a mating block having a mating tongue and a mounting portion and a housing block having a board portion with a mounting opening and a frame portion, the mounting portion of the mating block is retained in the mounting opening and the mating tongue is surrounded by the frame portion to define a mating cavity between the mating tongue and the frame portion, and the mating faces of the first terminals are arranged along the mating tongue.

6. The electrical connector as claimed in claim 1, further comprising a row of second terminals and a second shielding plate, wherein the second shielding plate defines a plurality of second grounding portions, and each second grounding portion defines a vertical cutting face which touches an inner face of a grounding terminal of the second terminal.

7. The electrical connector as claimed in claim 6, wherein the first shielding plate and the second shielding plate are united by a connecting bar at top edges thereof.

8. The electrical connector as claimed in claim 6, wherein the second shielding plate defines a second shielding portion between two adjacent second grounding portions; viewed from a bottom end of the electrical connector, the first shielding portion and the second shielding portion are aligned with each other, the first and second grounding portion are L-shaped, and each first grounding portion bends from a first side of the first shielding portion while each second grounding portion bends from a second side opposite to the first side of the second shielding portion.

9. The electrical connector as claimed in claim 6, wherein viewed in a direction perpendicular to the first and the second shielding portion, the first grounding portions are overlapped with adjacent second grounding portions.

10. The electrical connector as claimed in claim 1, further comprising a metallic shell, wherein the metallic shell surrounds the housing and extends upwards beyond a mating face of the housing.

11. The electrical connector as claimed in claim 10, wherein the metallic shell comprises a first side plate, a second side plate, and two end plates connecting with the first side plate and the second side plate, the first side plates defines a locking hole, the end plate defines a first taller portion and a second taller potion extending upwards beyond the mating face, and the second taller portions are flushed with the first side plate and higher than the first taller portions.

12. The electrical connector as claimed in claim 11, wherein a plurality of guiding tabs extend upwards from the second taller portions and the first side plate.

13. An electrical connector comprising:
a housing;
two rows of terminals retained in the housing, each row of terminals comprising signal terminals and grounding terminals, each terminal comprising a plate portion and a leg portion extending out of the housing;
two shielding plates located between the two rows of terminals, each shielding plate defining a plurality of grounding portions contacting corresponding grounding terminals of a corresponding row of terminals and a plurality of shielding portions each between two adjacent grounding portions;

wherein in a first shielding plate of the two shielding plates, each grounding portion bends from a first side of a corresponding shielding portion of the first shielding plate, while in a second plate of the two shielding plates, each grounding portion bends from an opposite second side of a corresponding shielding portion of the second shielding plate.

14. The receptacle connector as claimed in claim 13, wherein the shielding plate define a plurality of L-shaped slits running through a bottom edge thereof, and the grounding portions bend along the corresponding L-shaped slits.

15. The receptacle connector as claimed in claim 13, wherein a connecting bar connects the two shielding plates.

16. The receptacle connector as claimed in claim 15, wherein adjacent shielding portions are separated from each other and are unitarily connected with the connecting bar, and adjacent grounding portions are separated from each other and are separated from the connecting bar.

17. An electrical connector comprising:

a housing;

a row of first terminals arranged in the housing in a first direction and comprising signal terminals and grounding terminals, each first terminal comprising a plate portion extending in a second direction and a leg portion extending out of the housing;

a first shielding plate defining a plurality of shielding portions extending in the first direction and the second direction and a plurality of grounding portions bending from corresponding shielding portions and contacting corresponding grounding terminals of the row of first terminals, the shielding portions extending in the first direction and the second direction;

wherein the shielding portions are separated from each other and the grounding portions bend from left sides of corresponding shielding portions.

18. The electrical connector as claimed in claim 17, further comprising a row of second terminals and a second shielding plate, wherein the second shielding plate defines a plurality of shielding portions and a plurality of grounding portions bending from corresponding grounding portions and contacting corresponding grounding terminals of the row of second terminals, the shielding portions of the second shielding plate are separated from each other, and the grounding portions bend from right sides of corresponding shielding portions of the second shielding plate.

19. The electrical connector as claimed in claim 18, wherein the shielding portions of the first shielding plate and the second shielding plate are united with a connecting bar.

* * * * *